Figure 1:
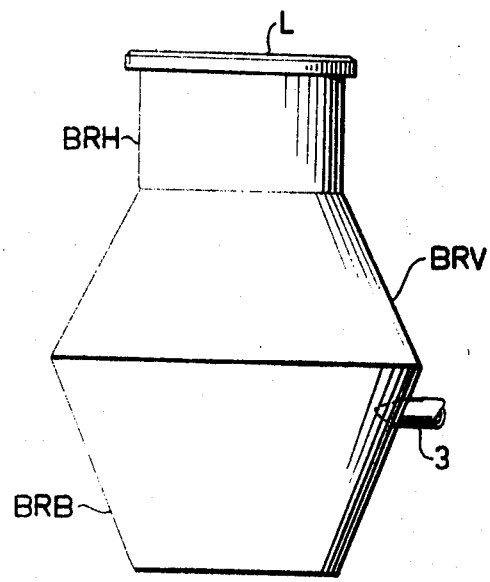

United States Patent

[11] 3,598,236

| [72] | Inventors | Nils-Olof Nordlander<br>Sigtuna;<br>Sixten Englesson, Djursholm; Sven Gustaf<br>Yngve Gamer, Norrkoping, all of, Sweden |
|---|---|---|
| [21] | Appl. No. | 800,155 |
| [22] | Filed | Feb. 18, 1969 |
| [45] | Patented | Aug. 10, 1971 |
| [73] | Assignee | Stenberg-Flygt AB<br>Solna, Sweden |
| [32] | Priority | Aug. 8, 1968 |
| [33] | | Sweden |
| [31] | | 10,727 |

[54] SYSTEM FOR PURIFYING SEWAGE WATER BY MEANS OF FLOCULATION AND AERATION
11 Claims, 4 Drawing Figs.

[52] U.S. Cl. .................................................. 210/104, 210/195, 210/220
[51] Int. Cl. .................................................. C02c 5/10
[50] Field of Search ........................................ 210/104, 195, 220, 221, 7, 15, 16

[56] References Cited
UNITED STATES PATENTS

| 1,893,623 | 1/1933 | Imhoff | 210/195 |
| 3,244,285 | 4/1966 | Allen | 210/195 X |
| 3,251,471 | 5/1966 | Allen | 210/220 X |
| 3,355,023 | 11/1967 | Foster | 210/221 X |
| 3,366,242 | 1/1968 | Nicol | 210/220 X |
| 3,374,893 | 3/1968 | Stretton | 210/220 X |
| 3,415,379 | 12/1968 | Thayer | 210/220 X |
| 3,419,146 | 12/1968 | Koulovatos | 210/195 X |
| 3,487,937 | 1/1970 | Koulovatos | 210/195 |
| 3,495,711 | 2/1970 | Englesson et al. | 210/195 |

FOREIGN PATENTS

| 1,025,771 | 4/1966 | Great Britain | 210/195 |
| 1,324,936 | 3/1963 | France | 210/195 |

*Primary Examiner*—J. L. DeCesare
*Attorney*—Sughrue, Rothwell, Mion, Zinn & MacPeak ABSTRACT: A system for purifying sewage water by flocculation and aeration using a buffer chamber, a flocculating chamber, a sedimentation and sludge concentration chamber and a regenerating and sludge activating chamber. The system uses activated sludge as a flocculating agent. The system further comprises a mammoth pump between the buffer and flocculating chambers and another between sedimentation and regenerating chambers. A tiltable bucket regulates the sludge feed to the regenerating chamber permitting a part of the fluid flow to pass by the side. The bucket by means of a valve, further controls a driving air supply to another mammoth pump, the transmitted quantity of activated sludge to the regenerating chamber being thus adjusted to match the quantity of sewage water measured by the bucket.

3,598,236

SYSTEM FOR PURIFYING SEWAGE WATER BY MEANS OF FLOCULATION AND AERATION

This invention refers to a system for purifying sewage water by means of flocculation and aeration, a buffer or equalizing chamber for collecting the incoming sewage water, a flocculating chamber, where activated or regenerated sludge is used as flocculating agent, a sedimentation chamber for the concentration and enrichment of the sludge and the separation of the water phase through a spillway, a regenerating chamber for the activating of the enriched sludge, and at least one mammoth pump between the buffer and the flocculating chambers and another one between the sedimentation and regenerating chambers. This arrangement will result in a sludge feed regulated in a particular manner.

Previously it has been proposed to add regenerated sludge as flocculating agent in the incoming sewage water, in a quantity which corresponds to the incoming quantity of sewage water. According to the proposal, a tippable bucket would be employed for the purpose, whereby the quantity of incoming sewage water would be measured by means of repeated filling and emptying. The tippable bucket would thereby regulate either another bucket or a valve, thereby making certain that sludge in a certain fixed proportion is supplied to the incoming sewage water. However, the quantity of biochemical substance, BS, contained in different types of sewage water is not the same, and, in addition, the quantity of biochemical substance BS contained in one and the same system can vary at different times of the day. Thereby the quantity of activated sludge to be used as flocculating agent will not always be correctly proportioned in relation to the quantity of incoming biochemical substance which is to be flocculated.

According to the invention it is therefor proposed, for a system of the above mentioned type, to operatively connect a mammoth pump between the buffer chamber and the flocculating chamber, where the mammoth pump through its pumping characteristic gives a suitable levelling out of the variations in the flow to the buffer chamber. A dosing device for regulated sludge feeding (for example, a tippable bucket), is so situated in relation to the outlet of the mammoth pump that a part of the fluid flow is permitted to pass by the side of the bucket, so that for a certain quantity of sewage water measured by the bucket and passed to the flocculating chamber by means of a valve, a second mammoth pump between the sedimentation and regenerating chambers will receive a certain corresponding quantity of driving air. In this manner quantity of enriched sludge corresponding to the quantity of sewage water measured in the bucket is transferred to the regenerating chamber. The adjustment of the outlet from first the mammoth pump can either be set permanently for a certain system, corresponding to the type of sewage water to be treated there, or this adjustment for one and the same system can be varied for different times of the day. Alternatively, an arrangement can be connected between the mentioned outlet and dosing device, which depending upon the quantity of incoming sewage water permits a greater or lesser part of the water flow to pass by the dosing device.

According to a further development of the invention, the regenerating chamber is equipped with a spillway for the supply of regenerated sludge to the flocculating chamber or buffer chamber, whereby the level of the sewage water mentioned will lie over the level of the spillway for the sedimentation chamber for the water phase. It is thereby preferable that the spillway for the water phase of the sedimentation chamber should be connected with the buffer chamber, which has a spillway with a level somewhat lower than the level in the first mentioned spillway.

By means of this arrangement it is ensured that at unusual flow of water to the buffer chamber, for example, at intensive bathing or rain, the overflow of the water, which generally contains inconsiderable quantities of biochemical substance BS, can be passed on without being treated in the system. Due to the fact that all the levels of the system for the biologic purification process lie over the spillway of the buffer chamber, the biological process can proceed undisturbed by possible peaks in the sewage water. Thus a guarantee is created against damage to the culture of micro-organisms in the system during periods of excess supply of sewage water. The spillway of the buffer chamber is preferably constructed in the form of a pipe, emerging in the buffer chamber, which has an elbow the end of which forms a spillway with, in relation to the length axle of the pipe, an inclined, circular or oval edge. In order to hinder oil which may have penetrated into the buffer chamber from being passed on to the outlet the inclined edge of the spillway, at a certain distance from its end, is surrounded by a collar consisting of rubber or plastic cloth.

However, by means of a further development of the invention, a guarantee is achieved that the micro-organic cultures meant for breaking down the biochemical substance cannot be damaged either by too little or an entirely lacking supply of sewage water. According to this further development the sedimentation chamber is equipped with an additional mammoth pump which extends downwards only to the water phase, and which preferably by means of a solenoid valve in the connecting pipe between the sedimentation chamber and the buffer chamber is started or opened under control by a level detecting device in the buffer chamber, when the level in this is below a certain predetermined value, whereby the overflow from the sedimentation chamber to the buffer chamber continues for a certain period or until the levels are levelled out. Thus, purified water, as compensation for a nonexistent supply of sewage water, is supplied to the buffer chamber, so that the function of the system is maintained. The system thereby maintains a certain no load operation, which keeps the sludge in the sedimentation chamber in a condition of aerobic respiration.

It is advisable that the taking up function of the mammoth pump regarding the water phase in the sedimentation chamber is not cut off immediately after the desired level in the buffer chamber is reached, but to, for example, by means of a time delay device, let this mammoth pump continue to pump an additional certain quantity of water from the sedimentation chamber to the buffer chamber, in order to have a safety margin for the functioning of the system.

Figure 2:
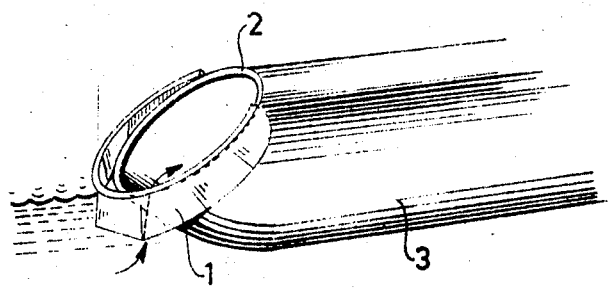
Figure 3:
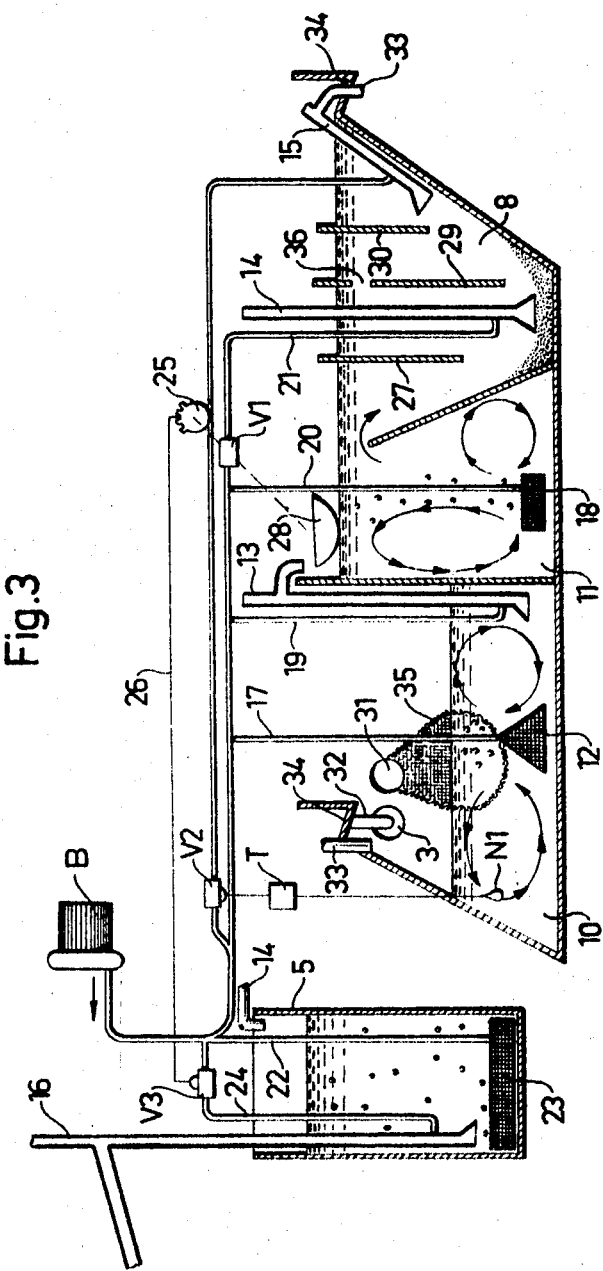
Figure 4:
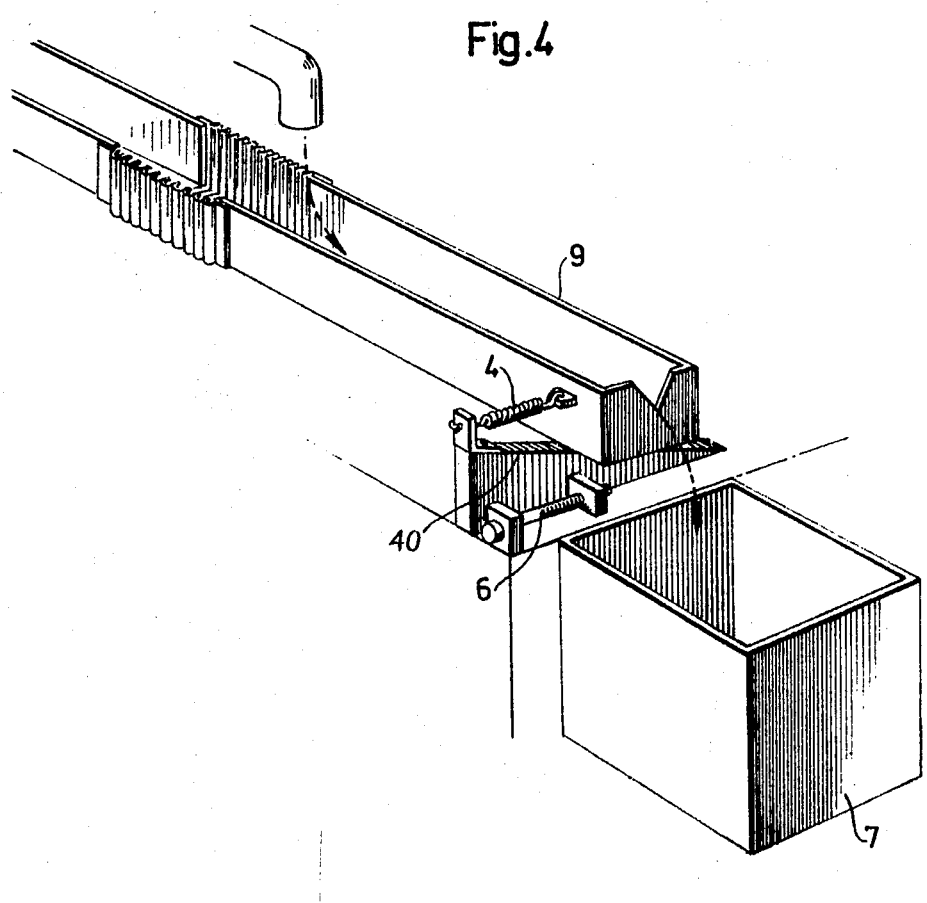

The invention will now be described in more detail in connection with the attached drawing, on which, FIG. 1 shows the outer shape of a particular design of the invention, FIG. 2 shows the spillway for the outlet pipe of the system, FIG. 3 shows a skeleton drawing of the system, FIG. 4 shows an example of a device for varying the supplied quantity of sewage water to the dosing device in relation to the total quantity of sewage water supplied.

The well shown in FIG. 1 consists of a downwards tapering conical-shaped bottom part, BRB, on top of this is placed an upwards tapering conical-shaped part, BRV, and placed on the top of this a cylindrical part, BRH, which is fitted with a lid L. An outlet pipe 3 extends from the bottom BRB.

In FIG. 2 the outlet pipe 3 is shown. The end of pipe 3 has an elbow 1, and affixed thereto is a circular or oval spillway edge 2. In order to hinder oil which may have penetrated into the buffer chamber of the system from passing the spillway, the edge 2 is at a certain distance from the buffer chamber surrounded by a collar 1 of rubber or plastic cloth.

In FIG. 3 a system is illustrated for sewage water purification similar to that described in our Swedish application 4785/67. The outer wall of the bottom part BRB, carried out as a well, is visualized unrolled, whereby in its inside arranged, mainly running radially as wings, dividing walls between the various section chambers of the system have been shown in sections, as well as the bottom and outer walls of the well. Screen walls in the sedimentation chamber have also been shown in the same manner. The regenerating chamber 5 has, for the sake of clearness, been moved from its position in the middle of the well BRB and put by the side of the unrolled wall, whereby it has been schematically illustrated that the regenerating chamber is meant to lie somewhat over the bottom in the other chambers.

As is shown in FIG. 3 the buffer chamber 10 is provided with an inlet 31 for the sewage water as well as a spillway 3. To the inlet 31 a new basket 35 is connected for the purpose of coarse straining of the water. The buffer chamber is on the bottom provided with an airing cushion 12 functionally dividing it in two parts and thus achieving a strong airing in two cylinder shaped rotating water zones. In this manner good preparation for flocculation, which will occur in the next chamber—the flocculating chamber—is obtained. This chamber is also provided with an airing cushion 18.

The air supply to the airing cushion 12 as well as the airing cushion 18 and the airing cushion 23 covering the bottom of the regenerating chamber 5 as well as to the previously mentioned mammoth pumps is obtained by means of a common blowing machine B, which supplies these parts of the system with air through the pipes 17, 19, 20, 21, 22, 24 and 26.

From the buffer chamber 10 the sewage water is pumped by means of the mammoth pump 13 to the flocculating chamber 11, where a part of the sewage water flow is collected by a dosing device in the shape of a tippable bucket 28. Depending upon the total quantity of the incoming sewage water and thereby indirectly also on the quantity of biochemical substance BS which the sewage water contains, a greater or lesser part of the sewage water flow will be collected in the bucket 28 whilst the remainder of the flow will run by the side of it down in the flocculating chamber 11. In this chamber a calm airing is taking place by means of an airing cushion 18, of plastic foam. From the flocculating chamber the water is directed over the wall of the sedimentation chamber 8, and past three screens 27, 29, 30 to the spillway 34. Meanwhile the floor has time to sedimentate in the bottom of the sedimentation chamber 8, so that the spillway 34 is reached by clear water. From the spillway 34 the water runs out in the outlet 32 and 3.

Between the outlet of the mammoth pump 13 and the dosing device there may be arranged a flow detecting device which, in principle, is illustrated in FIG. 4. A spring suspended gutter 9 is supported by an inclined surface 40 and at increasing quantity of water it can slide sideways against the action of the spring 4. Thereby the water jet, running over a skiboard at the end of the gutter, will partly come by the side of the dosing device of the collecting bucket 7. By means of a screw 6 the start position of the gutter 9 can be set.

From the sedimentation chamber 8 the sludge is pumped by means of a mammoth pump 14 over to the regenerating chamber 5. On the bottom of the regenerating chamber is an airing cushion 23 which covers the entire bottom. Under control of the bucket 28 in the flocculating chamber 11 the mammoth pump 14 functions in such a way, that each time the bucket tips a direct connected valve V1 for air supply is opened to the mammoth pump 14. Since the bucket 28 only takes up a quantity of sewage water which corresponds to the quantity of BS present in it, the quantity of sludge in return supplied to the regenerating chamber 5, will correspond to the above quantity of BS.

As can be seen from the aforesaid, all levels which are of importance to the biochemical purification process, are situated above the level of the spillway 2 of the buffer chamber, which is the outlet 3 of the system.

In the regenerating chamber 5 the incoming sludge is spread out over the entire airing cushion 23, whereafter it slowly rises upwards, while new sludge is supplied by the mammoth pump 14. By means of an extra control device 25 on the axle of the tippable bucket 28 a valve device V3 is actuated. For example, this can occur for every fifth stroke of the bucket. This valve device supplies air to a mammoth pump 16 which drains a certain quantity of the finally treated active sludge from the regenerating chamber 5 to the inlet or flocculating chambers to act as a flocculating agent.

As previously mentioned the controlled feeding of the sludge according to the invention means not only that the system is ensured against unexpected peaks in the incoming flow of sewage water, but even that those cultures of micro-organisms, which are meant to consume the biochemical substance contained in the sewage water, are protected against breaking down from shortage of oxygen and aerobic bacteria, due to the fact that the system, even during periods of low supply of sewage water or entirely lacking supply of sewage water, continues to function. In this way there is a kind of protection against low or zero load as the station is kept functioning under no load operation. This protection is obtained in the following manner:

When the station at low supply of sewage water, e.g. during the night, is not loaded and the level in the buffer chamber 10 has sunk so that the mammoth pump 13 no longer transfers any sewage water to the bucket 28 and the flocculating chamber 11, there is, as mentioned, a risk that the exchange of sludge in the chamber 8 will cease and that the sludge due to shortage of oxygen, will be anaerobic. The investigations made by the inventors show that the sludge in the sedimentation chamber in a system of this kind should not have a retention time which exceeds 2 to 4 hours.

In order to avoid the above mentioned risk, a level detecting device, N1 which controls a solenoid valve V2 that in its turn opens the supply of air to the mammoth pump 15 in the sedimentation chamber 8, is arranged in the buffer chamber 10. As soon as the air coming through the valve V3 is supplied to the mammoth pump 15, this will pump clear water to the spillway (pipe 33) from which the water will flow into the buffer chamber 10. As soon as the level in this chamber has risen to the extent that the mammoth pump 13, once again can start, the water is pumped to the tippable bucket 28 which once more will start the mammoth pump 14, whereby sludge again will be pumped from the sedimentation chamber 8 to the regenerating chamber 5.

In order that the arrangement shall function well at least 50 to 75 litres of clear water should be pumped over from the sedimentation chamber 8 to the buffer chamber 10 before the level detecting device shall discontinue the process. In order to ensure this, the actuation of the valve V2 does not occur directly via the level detecting device N1 but via a time delay device T, which does not delay switching in, i.e. opening of the valve V2 but delays its closing.

Although the invention has been described in connection with an execution design of it, it can, however, be varied in an arbitrary way within the scope of the following claims.

We claim:
1. A system for purification of sewage water by means of flocculation and aeration comprising
   a. a buffer chamber for collecting the incoming sewage water which contains sludge;
   b. a flocculation chamber wherein regenerated sludge serves as a flocculating agent;
   c. a sedimentation chamber for concentrating sludge and separating purified water from the sludge through a spillway;
   d. a regeneration chamber for activating the sludge from said sedimentation chamber;
   e. means for transferring said activated sludge from said regeneration chamber to said flocculation chamber wherein said activated sludge acts as said flocculating agent;
   f. a first pump between said buffer chamber and said flocculation chamber for pumping sewage water from the buffer chamber to the flocculation chamber;
   g. a second pump between said sedimentation chamber and said regeneration chamber for pumping the concentrated sludge from the sedimentation chamber to the regeneration chamber;
   h. sensing means at the outlet of said first pump for sensing the amount of sludge in said water; and i. control means coupled to said sensing means for controlling said means for transferring said activated sludge whereby the amount of flocculating agent transferred from said regeneration chamber to said flocculating chamber is dependent upon the amount of sludge in said sewage water.

2. The system of claim 1 wherein said sensing means comprises a tiltable bucket and said control means further controls said first pump.

3. The system of claim 1 further comprising a fluid flow sensing means connected to the outlet of said first pump for decreasing the proportion of fluid supplied to said sensing means when the quantity of incoming sewage water increases.

4. The system of claim 3 wherein said fluid flow sensing means comprises a spring suspended gutter with a skiboard and an inclined supporting surface for said gutter whereby an increased quantity of sewage water will cause said gutter to swing sideways down said incline thereby diverting the fluid flowing from said detecting means.

5. The system of claim 1 wherein said means for transferring said activated sludge from said regeneration chamber to said flocculating chamber comprises a spillway.

6. The system of claim 5 wherein said spillway of said sedimentation chamber is connected to said buffer chamber, said buffer chamber further comprising a spillway the level of which is lower than the spillway of said sedimentation chamber.

7. The system of claim 1 wherein said buffer chamber includes an outlet comprising a pipe with an elbow at its end whereby the edge of the end forms an inclined circular opening in relation to the axis of said pipe.

8. The system of claim 7 further comprising collar means surrounding the end of said pipe for protecting against the penetration of oil into said buffer chamber.

9. The system of claim 1 further comprising
a. a third pump in said sedimentation chamber wherein the pump is set at a level such that it only pumps purified water from said sedimentation chamber;
b. level sensing means located in said buffer chamber for producing an output when the sewage water level in said buffer chamber is lower than a predetermined value; control means connected to said level sensing means for controlling the operation of said third pump whereby when said sewage water drops below said predetermined level said third pump pumps water from said water phase into said buffer chamber.

10. The system of claim 9 wherein said control means further comprises means for stopping said third pump after a predetermined time or when the level in said buffer chamber reaches a second predetermined level.

11. The system of claim 10 wherein said sedimentation chamber further includes an aeration means covering the bottom of said sedimentation chamber wherein said aeration means starts to aerate when the level of said buffer chamber is lower than a predetermined value.